United States Patent Office 3,150,104
Patented Sept. 22, 1964

3,150,104
REMOVAL OF VANADIUM AND NICKEL FROM SILICA BASED CRACKING CATALYST
Leon M. Lehman, Brooklyn, N.Y., assignor, by mesne assignments, to Sinclair Research, Inc., New York, N.Y., a corporation of Delaware
No Drawing. Filed Mar. 24, 1961, Ser. No. 97,993
11 Claims. (Cl. 252—415)

This invention concerns the removal of poisoning metal from a synthetic gel hydrocarbon conversion catalyst which has been contaminated with metal by use in the high temperature catalytic conversion of feedstocks containing such metal. The invention may be used alone or as part of an overall metals removal procedure employing a plurality of processing steps to increase the amount of vanadium or other metal contaminants removed by the process.

The invention comprises chlorination of the poisoned catalyst outside the conversion system with a vaporous chlorinating mixture to provide and/or remove poisoning metals in the chloride form. The catalyst is contacted at moderately elevated temperature with a vaporous chlorinating mixture comprising an essentially anhydrous chlorinating agent and a gaseous inert diluent. The effectiveness of the metals removal may be significantly increased by subjecting the catalyst, after conventional regeneration, to treatment with a gas containing molecular oxygen and/or to a sulfiding gas at an elevated temperature before chlorination. Other processing steps may also be employed. Copending patent applications Serial Nos. 758,681, filed September 3, 1958, now abandoned; 763,833 and 763,834, filed September 29, 1958, now forfeited; 767,794, filed October 17, 1958; 842,618, filed September 28, 1959; 849,199, filed October 28, 1959; 19,313, filed April 1, 1960, now abandoned; 39,810, filed June 30, 1960; 47,598, filed August 4, 1960; 53,380, filed September 1, 1960; 53,623, filed September 2, 1960; 54,368; 54,405 and 54,532, filed September 7, 1960; 55,129; 55,160 and 55,184, filed September 12, 1960; 55,703, filed September 13, 1960; 55,838, filed September 14, 1960, now abandoned; 67,518, filed November 7, 1960; 73,197, filed December 2, 1960; 81,256 and 81,257, filed January 9, 1961, now abandoned, describe procedures by which vanadium and other poisoning metals included in a solid oxide hydrocarbon conversion catalyst are removed by subjecting the catalyst, outside the hydrocarbon conversion system, to elevated temperature conditions which put metal contaminants into a water-dispersible or more available form. This invention provides for greater metals removal when practiced in conjunction with these and other procedures.

Catalytically promoted methods for the chemical conversion of hydrocarbons include cracking, hydrocracking, reforming, hydroforming, coking, deasphalting, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e. liquid or vapor, state and the products of the conversion frequently are lower boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1050° F., preferably about 850 to 975° F., at pressures up to about 100 p.s.i.g., preferably about atmospheric to 5–15 p.s.i.g., and advantageously without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel or gelatinous catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example, it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½″ in diameter. When fresh, the minimum sized bead is generally about ⅛″. Other types of process use other forms of catalyst such as tablets or extruded pellets.

One of the most important phases of study in the improvement of catalyst performance in hydrocarbon conversion is in the area of metals poisoning. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. Thus Venezuelan crudes or their fractions make ideal feeds for the present process when the demetallization is essentially just the chlorination or other steps designed primarily for vanadium removal. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of butanes, butylenes and gasoline, based on converting 60 volume percent of cracking feed to lighter materials and coke dropped from 58.5 to 49.6 volume percent when the amount of nickel on the catalyst increased from 55 p.p.m. to 645 p.p.m. and the amount of vanadium increased from 145 p.p.m. to 1480 p.p.m. in fluid catalytic cracking of a feedstock containing some metal contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

A further alternative, demetallizing the catalyst, which avoids discarding of expensive catalyst and enables much lower grade, highly metals-contaminated feedstocks to be used, is now possible in this invention. In the process of this invention a catalyst contaminated with vanadium and/or nickel use in converting a petroleum feedstock containing such metal may be treated for removal of one or both of vanadium and nickel and for iron removal as well. Although referred to as "metals," these catalyst contaminants may be in the form of free metals or relatively non-volatile metal compounds. It is to be understood that the term "metal" used herein refers to either form.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253; 2,488,718; 2,488,744; 2,668,798 and 2,693,455, the process of this invention is particularly effective to remove vanadium and other metals without endangering the expensive catalyst.

In this invention the hydrocarbon petroleum oils utilized as feedstock for a conversion process may be of any desired type normally utilized in catalytic conversion operations. This feedstock contains one or all of nickel, iron and vanadium, sometimes as much as 0.3%, and the catalyst may be used as a fixed, moving or fluidized bed or may be in a more dispersed state. For typical operations, the catalytic cracking of the hydrocarbon feed would often result in a conversion of about 50 to 60% of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. Ordinarily, the catalysts are taken from the hydrocarbon conversion system and treated before the poisoning metals have reached an undesirably high level, for instance, about 2%, generally no more than about 1% maximum, content of vanadium, iron and nickel.

This invention makes use of vapor phase chlorination at a moderately elevated temperature up to about 700° F. or even up to about 900 or 1000° F., wherein the catalyst composition and structure is not materially harmed by the treatment and a substantial amount of the poisoning metals content is converted to chlorides. The chlorination takes place at a temperature of at least about 300° F., preferably about 550 to 650° F., with optimum results being obtained close to about 600° F. The chlorination, even when conducted in the lower temperature ranges, e.g. below about 550° F., is effective for conversion to chlorides of the metal poisons, being rather complete in the case of nickel. In the higher temperature ranges, above about 550° F., the treatment with the vaporous chlorinating mixture serves simultaneously also to remove, by volatilization, vanadium chlorides such as vanadium oxychloride and/or vanadium tetrachloride formed by chlorination. When volatilization of these compounds is not performed or not completed during chlorination, the chlorination may be followed by a purge with an inert gas such as nitrogen or flue gas in these higher temperature ranges, that is, about 550° F. to 700° F. or 1000° F. for volatilization of these compounds. Also, further metal chlorides, particularly nickel, can be removed subsequent to the chlorination by contacting the catalyst with a liquid aqueous medium or other procedures.

The chlorinating mixture is essentially anhydrous, that is, if changed to the liquid state no separate aqueous phase would be observed. As the amount of water in the chlorinating agent increases, additional time and/or chlorinating agent may be required to obtain a given amount of metal removal. This inhibiting effect is also evident when water is present in the catalyst so that it is preferred that the catalyst contain less than about 1 or 2% volatile matter, that is, matter which is removable by heating to 1000° C. A pressure of about 0–100 or more p.s.i.g., preferably 0–15 p.s.i.g. may be maintained in chlorination, the contacting usually lasting for at least about five minutes, preferably about 15 minutes to an hour, but shorter or longer reaction periods may be possible or needed, for instance, depending on the linear velocity of the vapors.

The chlorinating mixture contains a chlorinating agent and a gaseous inert diluent. The chlorinating agent is a vaporizable covalent compound of chlorine with carbon or sulfur. The carbon compounds of chlorine which may be employed are generally the chlorine-substituted light hydrocarbons which may be introduced to the chlorination reactor as such or may be produced during the chlorination from a mixture of a chlorine gas with low molecular weight hydrocarbons. Preferably the carbon compound of chlorine employed is carbon tetrachloride. Useful inorganic sulfur-containing compounds include the volatizable sulfur chlorides, viz. sulfur monochloride, $S_2Cl_2$, sulfur dichloride, $SCl_2$, thionyl chloride, $SOCl_2$, and sulfuryl chloride, $SO_2Cl_2$.

The gaseous inert diluent, the other component of the chlorinating mixture, may advantageously be nitrogen or air or any other gas inert under the reaction conditions, such as $CO_2$. However, it is preferable to avoid the use of inert gases containing hydrocarbons, even in small amounts. It has been found that the addition of a diluent such as nitrogen or air may be effective in reducing the amount of the chlorinating agent used for effective conversion of, for instance, vanadium to its volatile chlorides. In addition to maintaining the desired conversion level, the presence of the diluent is also effective in minimzing the cost of chlorinating procedures by reducing the expense heretofore incurred for chlorinating agents, reducing the expense of heat requirements presently incurred in vaporizing excess amounts of chlorinating agents, reducing the expense of additional reagents previously found necessary to neutralize the excess chlorinating agent, and reducing the expense of equipment replacement occasioned by the corrosive characteristics of excess chlorinating agent.

It has also been found that a chlorinating gas comprising molecular chlorine or hydrogen chloride or their mixture may advantageously be employed with the covalent chlorinating agent of this invention to form a chlorinating combination. In the presence of the chlorinating agent of this invention, the chlorinating gas, besides serving to convert poisoning metals to chlorides, appears also to have the effect of keeping the vanadium in its higher, more volatile valence state; that is, the vanadium is maintained as vanadium oxytrichloride or vanadium tetrachloride. Also, it has been found that the chlorinating agent may be provided in lesser amounts when molecular chlorine or the electrovalent HCl is present, while still resulting in substantial effective conversion of contaminating metals to their chlorides at the moderate temperatures of the process. This is perhaps due to regeneration of the agent in situ during the chlorination. Molecular chlorine and HCl are considerably less expensive than, say, carbon tetrachloride or other agents and thus a combination of the agent and molecular chlorine or HCl is economically attractive.

The vaporizable covalent carbon or sulfur compounds of chlorine are generally used in the amount of about 0.5–50 percent, preferably 1–10 percent, based on the weight of the catalyst, for good metals removal. The amount of the agent may vary, however, depending upon the manipulative aspects of the chlorination step, for example, a batch treatment may sometimes require more agent than a continuous treatment for the same degree of effectiveness and results.

When molecular chlorine or HCl are employed with the chlorinating agent they are supplied in amounts generally ranging from about 0–100 percent, preferably about 1–25 percent based on the weight of the catalyst to provide a chlorinating combination of about 0.5–150 percent, preferably about 2–35 percent, based on the weight of the catalyst. Conveniently then a preferred combination would contain about 0.04 to 10 parts by weight of $CCl_4$ or $S_2Cl_2$ per part of molecular chlorine or HCl.

The gaseous inert diluent advantageously is used in amounts of about 1–25%, preferably 2–15 percent based on the weight of the catalyst treated, or about 10–95 mole percent, preferably 25–75 mole percent based on the chlorinating mixture, which would include the aforementioned quantities of molecular chlorine or HCl.

The chlorination reaction proceeds to convert catalytically active vanadium and nickel to their chlorides and to remove some volatile chloride. In some cases, particularly when the chlorination is performed at a temperature too low to volatilize sufficient of the chlorides and it is desired to remove vanadium, the chlorination treatment is therefore followed, or interrupted, by a purge of the catalyst with an inert gas. The purging usually need be performed at a temperature no higher than about 700° F.

Where chlorination alone produces the demetallization desired, for example, where vanadium is the principal poison on the catalyst and the chlorination, properly performed, removes the desired amount of poison, the catalyst is conducted after chlorination to its conversion system. Prior to reusing the catalyst in the hydrocarbon conversion operation, it can be calcined in air say at temperatures usually in the range of about 700 to 1300° F., conveniently by addition to the cracking unit catalyst regenerator. Prolonged treatment with an oxygen-containing gas at above about 1100° F. may sometimes be disadvantageous. Calcination removes free water, if any is present, and perhaps some, but not all of the combined water and leaves the catalyst in an active state without undue sintering of its surface. Such a treatment is of further value for the removal of entrained chlorine material from the catalyst which may cause undesired results in further use of the catalyst.

The process of this invention produces significantly greater removal of vanadium when, upon removal of the vanadium-poisoned catalyst from the reactor, it is regenerated and given a treatment at elevated temperatures with molecular oxygen-containing gas before chlorination. Also, vanadium removal may be accomplished, in lieu of purging, by washing the catalyst after chlorination, with an aqueous solution containing ammonium ions before returning the catalyst to the hydrocarbon conversion system as disclosed in copending application S.N. 39,810. Prior to other treatments, subjecting the poisoned catalyst sample to magnetic flux may be found desirable to remove any tramp iron particles which may have become mixed with the catalyst.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about a few minutes, e.g. 5–10, and the oxygen content of the effluent gases from the regenerator is desirably less than about ½%. When later oxygen treatment is employed in this invention, the regeneration of the catalyst is generally regulated to give a carbon content of less than about 0.5%.

Treatment of the regenerated catalyst with molecular oxygen-containing gas to increase vanadium removal is described in copending application Serial No. 19,313. The temperature of this treatment is generally in the range of about 1000 to 1800° F. but below a temperature where the catalyst undergoes any substantial deleterious change in its physical or chemical characteristics. The catalyst is, as pointed out, in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to provide a substantial amount of vanadium in its highest valence state as the catalyst surface, as evidenced by a significant increase, say at least about 10%, preferably at least about 100%, in the vanadium removal in subsequent stages of the process. This increase is over and above that which would have been obtained by the metals removal steps without the oxygen treatment.

The treatment of the vanadium-poisoned catalyst with molecular oxygen-containing gas prior to the chlorination is preferably performed at a temperature of about 1150 to 1350 or even as high as 1600° F. and usually is at least about 50° F. higher than the regeneration temperature. Little or no effect on vanadium removal is accomplished by treatment at temperatures significantly below about 1000° F., even for an extended time. The upper temperature, to avoid undue catalyst damage, will usually not materially exceed about 1600 or 1800° F. Preferably the temperature is about 1150 to 1350° F. The duration of the oxygen treatment and the amount of vanadium prepared by the treatment for subsequent removal is dependent upon the temperature and the characterstics of the equipment used. The length of the oxygen treatment may vary from the short time necessary to produce an observable effect in the later treatment, say, a quarter of an hour, to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness has been observed after about four hours of treatment.

The oxygen-containing gas used in the treatment contains molecular oxygen as the essential active ingredient, and there is little significant consumption of oxygen in this treatment. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. The factors of time, partial pressure and extent of vanadium stabilization may be chosen with a view to the most economically feasible set of conditions. It is preferred to continue the oxygen treatment for at least about 15 or 30 minutes with a gas containing at least about 1%, preferably at least about 10% oxygen. The maximum practical time of treatment will usually vary from about 4 to 24 hours, depending on the type of equipment used.

The chlorination method of the invention is of value, not only in the removal of vanadium from the catalyst, but also in putting nickel poisons into a form soluble in an aqueous medium. Also the chlorinating method may be used as a supplement, primarily for vanadium removal, to a complete processing scheme for nickel removal in which chlorination does not play a significant part. Sulfiding of the poisoned catalyst has been found to be advantageous for nickel and perhaps vanadium contaminant removal by subsequent chlorination and water washing or by other subsequent treatments which put nickel into a dispersible form, or which dissolve or disperse nickel directly from the sulfided catalyst. Sulfiding is described in copending patent applications Serial Nos. 763,834 and 842,618.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for instance at least about 5 or 10 minutes up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix. The sulfiding step performs the function not only of supplying a sulfur-containing metal compound which may be easily converted to chloride form but also appears to concentrate some metal poisons, especially nickel, at the surface of the catalyst particle.

After conversion by chlorination and usually after vaporization of vanadium chlorides the catalyst is washed in a liquid aqueous medium to remove metal, for instance nickel chlorides, preferably after the catalyst is cooled to avoid the use of excessive pressures to maintain the liquid phase. The catalyst structure may be quite sensitive to HCl formed in the treatment, so that several precautions should be observed in the aqueous liquid washing. A pH adjusting component may be employed. A great excess of water can be used, for instance, sufficient to give a slurry containing only minor amounts of solids, say about 2–20%. Also, the catalyst should not be allowed to remain in this slurry for too long a time, ordinarily not more than 5 minutes; a residence time of 2–3 minutes in the original wash water is generally preferred.

The water used is sometimes distilled or deionized prior to contact with the chlorinated catalyst. However, the aqueous medium can contain extraneous ingredients in trace amounts, so long as the medium is essentially water and the extraneous ingredients do not interfere with demetallization or adversely affect the properties of the catalyst. Temperatures of about 150° F. to the boiling point of water are helpful in increasing the solubility of the chloride. Temperatures above 212° F. and elevated pressures may be used but the results do not seem to justify the added equipment. Contact with the hot catalyst may be sufficient to raise the temperature of the water from ambient temperature to around the boiling point. The aqueous liquid is preferably acid and a weakly acid condition may be obtained by the chlorides generally present in a chlorinated catalyst which has not been purged too severely.

As mentioned, the catalyst may be given a basic aqueous wash after the slightly acidic wash. This wash serves for the removal from the catalyst of available vanadium remaining on it, perhaps due to insufficient purging in the chlorination step. In such a wash, as disclosed in co-pending application S.N. 39,810, the pH is frequently greater than about 7.5 and the solution contains ammonium ions, for example $NH_4+$ ions or organic-substituted $NH_4+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water. Preferred solutions use ammonium hydroxide and have a pH of about 8 to 11.

The amount of ammonia in the solution is sufficient to give the desired vanadium removal and will often be in the range of about 1 to 25 or more pounds per ton of catalyst treated. Five to fifteen pounds is the preferred ammonia range but the use of more than about 10 pounds does not appear to increase vanadium removal unless it increases pH. The temperature of the wash solution may be room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the acidic or ammonium wash the catalyst slurry can be filtered to give a cake which may be reslurried with water or rinsed in other ways, such as, for example, by a water wash on the filter, and the rinsing may be repeated, if desired, several times. After this or after the final treatment which may be used in the catalyst demetallization procedure, the catalyst is conducted to its conversion system, for instance to the hydrocarbon conversion reactor or catalyst regenerator, although it may be desirable first to dry the catalyst filter cake or filter cake slurry at say about 250 to 450° F. and also, prior to reusing the catalyst in the conversion operation it can be calcined in air as described above.

Alternative to the removal of nickel contaminants by procedures involving contact of the catalyst with aqueous media after chlorination nickel poison and some iron may be removed from the catalyst as volatile carbonyl by treatment before chlorination with carbon monoxide, as described in copending application Serial No. 47,598. In such a procedure the catalyst is treated with hydrogen at an elevated temperature during which nickel contaminant is reduced to the elemental state, then treated, preferably under elevated pressure and at lower temperature, with carbon monoxide, during which nickel carbonyl is formed and flushed off the catalyst surface. Some iron contaminant is also removed by this carbonylation treatment. Hydrogenation takes place at a tempearture of about 800 to 1600° F., at a pressure from atmospheric or less up to about 1000 p.s.i.g. with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation is continued until surface accumulations of poisoning metals, particularly nickel, are substantially reduced to the elemental state. Carbonylation takes place at a temperature substantially lower than the hydrogenation, from about ambient temperature to 300° F. maximum and at a pressure up to about 2000 p.s.i.g., with a gas containing about 50–100 mole percent CO. Preferred conditions include greater than about 90 mole percent CO, a pressure of up to about 800 p.s.i.g. and a temperature of about 100–180° F. The CO treatment generally serves both to convert the elemental metals, especially nickel and iron, to volatile carbonyls and to remove the carbonyls.

The demetallization procedure of this invention has been found to be highly successful when used in conjunction with fluidized catalyst hydrocarbon conversion systems to control the amount of metal poisons on the catalyst. When such catalysts are processed, a fluidized solids technique is recommended for these vapor contact demetallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time may have relatively little effect on the catalytic activity of the depoisoned catalyst, although further metals content may be removed by repeated or other treatments.

In the treatment to take poisoning metals from the cracking catalyst the amount of metal is removed which is necessary to keep the average metal content of the catalyst in the cracking system below the limit of the cracking unit's tolerance for poison. The tolerance of the cracker for poison in turn determines to a large extent the amount of metals removed in the catalyst demetallization procedure. Where the catalyst contains a greater amount of poisoning metal, a particular treatment will remove a greater amount of metal; for example, if the cracker can tolerate an average of 100 p.p.m. Ni and the demetallization process can remove 50% of the nickel content of the catalyst, only 50 p.p.m. of nickel can be removed in a pass through the catalyst demetallization system. However, where the cracker can tolerate 500 p.p.m. of nickel, it is possible to remove 250 p.p.m. nickel from the catalyst with each pass through the demetallization system. It is advisable, therefore, to operate the cracking and demetallization procedures with a catalyst having a metals content near the limit of tolerance of the cracker for poisoning metals. This tolerance for poisoning metal oxide is seldom greater than about 5000–10,000 p.p.m. Catalyst demetallization is not economically justified unless the catalyst contains at least about 50 p.p.m. nickel and/or 50 p.p.m. vanadium. Preferably the equilibrium metals level is allowed to exceed about 200 p.p.m. nickel and/or 500 p.p.m. vanadium so that total metals removal will be greater per pass through the demetallizer.

In the treatment to take poisoning metals from the cracking catalyst a large or small amount of metal can be removed as desired. The demetallization treatment generally removes about 10 to 90% of one or more poisoning metals from a catalyst portion which passes through the treatment. Advantageously, a demetallization system is used which removes about 60 to 90% nickel and 20–40% vanadium from the treated portion of catalyst. Preferably at least 50% of the equilibrium nickel content and 15% of the equilibrium vanadium content is removed. The actual time or extent of treating depends on various factors, and is controlled by the operator according to the situation he faces, e.g. the extent of metals content in the feed, the level of conversion unit tolerance for poison, the sensitivity of the particular catalyst toward a particular phase of the demetallization procedure, etc. Also, the thoroughness of treatment of any portion of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison. In a continuous operation of the commercial type a satisfactory treating rate may be about 5 to 50% of the total catalyst inventory in the system, per twenty-four hour day of operation although other treating rates may be used. With a continuously circulating catalyst stream, such as in the ordinary "fluid" system a slip-stream of catalyst, at the "equilibrium" level of poisoning metals may be removed intermittently or continuously from the regenerator standpipe of the cracking system. The catalyst is subjected to one or more of the demetallization procedures described above and then the catalyst, substantially reduced in contaminating metal content, is returned to the cracking system. The treatment of this invention is effective despite the presence of a small amount of carbon on the treated catalyst, but when there is coke on the catalyst, residual chlorine on the catalyst after chlorination is frequently at a higher level and is more difficult to remove. Also, where the catalyst is sent to the high temperature treatment with molecular oxygen-containing gas before it is substantially carbon free, the length of oxygen treatment, as recited above, is reckoned from the time that the catalyst reaches the substantially carbon-free state, that is the state where little, if any, carbon is burned or oxygen consumed even when the catalyst is contacted with oxygen at temperatures conducive to combustion. A further significant advantage of the process lies in the fact that the overall metals removal operation, even if repeated, does not unduly deleteriously affect the activity, selectivity, pore structure and other desirable characteristics of the catalyst.

In practice the process could be applied in a refinery by removing a portion of catalyst from the regenerator of the cracking system after a standard regeneration treatment to remove a good part of the carbon, heating this portion of the catalyst inventory in air for one to three hours at temperatures approximating 1100° F., cooling and then chlorinating the catalyst.

EXAMPLES I–VIII

The following examples are illustrative of the invention but should not be considered limiting.

A "Nalcat" synthetic gel silica-alumina fluid-type cracking catalyst composed of about 25% $Al_2O_3$, substantially the rest $SiO_2$, was used in a commercial cracking conversion unit, using conventional fluidized catalyst techniques, including cracking and air regeneration to convert a feedstock (A) comprising a blend of Wyoming and Mid-Continent gas oils containing 1.0 p.p.m. Fe, 0.3 p.p.m. NiO, 1.2 p.p.m. $V_2O_5$ and about 2 weight percent sulfur. This gas oil blend had a gravity (API) of 24°, a carbon residue of about 0.3 weight percent and a boiling range of about 500 to 1000° F. When this catalyst had the poisoning metals content of 327 p.p.m. NiO, 4240 p.p.m. $V_2O_5$ and 2700 p.p.m. Fe, a 400 gram sample of the catalyst was removed from the cracking system after regeneration and divided into eight equal portions, one of which remained untreated (Sample 1). The remaining seven fifty-gram batch samples were individually treated for about 16 hours at 1000° F. in air, sulfided in $H_2S$ for about 3 hours at 1175° F. and then treated at about 600° F. for about 1 hour at atmospheric pressure with chlorinating mixtures of various compositions after which they were slurried in deionized water, quickly filtered, dried and calcined.

Sample 2 was treated with a gaseous chlorinating combination comprised of about 7.5 mole percent $CCl_4$, the remainder $Cl_2$. Sample 3 was treated with a chlorinating combination of about 56.3 mole percent $CCl_4$, the rest $Cl_2$. The gaseous chlorinating mixture used in Sample 4 was comprised of about 3.8 mole percent $Cl_2$, 4.9 mole percent $CCl_4$ and the rest $N_2$. Sample 5 was treated with a chlorinating mixture of about 2.2 mole percent $Cl_2$, 39.0 mole percent $CCl_4$ and the rest essentially air. Sample 6 was treated with a mixture containing about 56.2 mole percent $CCl_4$ with substantially the rest $N_2$. Sample 7 was treated with a chlorinating combination containing about 33 mole percent $S_2Cl_2$, the rest substantially $Cl_2$. The gaseous chlorinating mixture with which Sample 8 was treated contains about 27 mole percent sulfur monochloride, the rest substantially $N_2$. The demetallization results of the foregoing runs are set forth below in Table I. After demetallization the catalyst samples are returned to a cracking system.

EXAMPLES IX–XI

A portion of the same catalyst removed from the same commercial operation at another time had the poisoning metals content of 328 p.p.m. NiO, 4320 p.p.m. $V_2O_5$ and 2800 p.p.m. Fe. The 180 gram sample of the catalyst was removed from the cracking system after regeneration and divided into three equal portions, one of which remained untreated (Sample 9). Sample 10 was treated for about 4 hours at 1300° F. in air, sulfided in $H_2S$ for about 1 hour at 1175° F. and then treated at about 600° F. for about 1 hour at atmospheric pressure with a chlorinating mixture of about 7.5 mole percent $S_2Cl_2$ with sufficient air to maintain fluidization after which it was slurried in deonized water, quckly filtered, dried and calcined. The results are set forth below in Table I.

Sample 11 was also treated for about 4 hours at 1300° F. in air, sulfided in $H_2S$ for about 1 hour at 1175° F. and treated at about 600° F. for about 15 minutes at atmospheric pressure with a chlorinating combination of about 8 mole percent $S_2Cl_2$, the rest substantially $Cl_2$. The results are also set forth below in Table I.

*Table I*

| Sample No. | 1 | 2 | 3 | 4 | 5 | 6 | 7 | 8 | 9 | 10 | 11 |
|---|---|---|---|---|---|---|---|---|---|---|---|
| $Cl_2$ (moles/hr.) | | 0.16 | 0.14 | 0.01 | 0.01 | | 0.014 | | | | 0.823 |
| $CCl_4$ (moles/hr.) | | 0.013 | 0.18 | 0.013 | 0.18 | 0.18 | | | | | |
| $N_2$ (moles/hr.) | | | | 0.24 | | 0.14 | | 0.09 | | | |
| Air (moles/hr.) | | | | | 0.27 | | | | | 0.32 | |
| $S_2Cl_2$ (moles/hr.) | | | | | | | 0.007 | 0.033 | | 0.026 | 0.071 |
| Metal content: | | | | | | | | | | | |
| NiO (p.p.m.) | 327 | 99 | 101 | 98 | 99 | 131 | 60 | 39 | 328 | 66 | 69 |
| $V_2O_5$ (p.p.m.) | 4,240 | 3,606 | 3,464 | 3,536 | 3,545 | 3,627 | 2,974 | 3,155 | 4,320 | 3,370 | 3,060 |
| Fe (p.p.m.) | 2,700 | 2,630 | 2,100 | 2,230 | 1,950 | 2,310 | 2,260 | 1,470 | 2,820 | 2,720 | 2,125 |
| Percent metals removed: | | | | | | | | | | | |
| NiO | | 70 | 69 | 70 | 70 | 60 | 82 | 88 | | 75 | 79 |
| $V_2O_5$ | | 15 | 18 | 17 | 16 | 14 | 31 | 26 | | 22 | 28 |
| Fe | | 2 | 22 | 17 | 28 | 14 | 22 | 46 | | 3 | 24 |

These results demonstrate that metals removal comparable to that experienced using a chlorinating combination may successfully be achieved by employing a chlorinating mixture containing an inert gas diluent.

It is claimed:

1. A method for treating a synthetic gel, silica-based cracking catalyst which has been poisoned by contamination with a metal selected from the group consisting of nickel and vanadium due to use of said catalyst in a cracking system wherein catalyst is cycled between a cracking zone, in which the catalyst is contracted at an elevated temperature with a hydrocarbon feedstock containing said metal contaminant which deposits on the catalyst, and a regeneration zone, in which carbon is oxidized and thereby removed from the catalyst, which comprises bleeding a portion of metal contaminated catalyst from the cracking system, contacting bled catalyst with a sulfiding gas at a temperature of about 500 to 1500° F. to enhance subsequent metal removal, chlorinating poisoning metal component on the catalyst by contact at a temperature of up to about 1000° F. with an essentially anhydrous chlorinating mixture comprising a chlorinating gas selected from the group consisting of hydrogen chloride and molecular chlorine in amounts up to about 100 percent based on the weight of the catalyst, a co-valent compound of chlorine with a member selected from the group consisting of carbon and sulfur in amounts of about 0.5–50 percent based on the weight of the catalyst, and an inert gaseous diluent in an amount of about 10–95 mole percent, based on the chlorinating mixture and about 1–25 percent based on the weight of the catalyst, washing the chlorinated catalyst with a liquid aqueous medium to remove metal chloride and returning resulting demetallized catalyst to a hydrocarbon cracking system.

2. The method of claim 1 in which bled catalyst, before contact with sulfiding gas, is contacted with a gas containing molecular oxygen for at least about 15 minutes at a temperature of about 1000 to 1800° F. to enhance subsequent vanadium removal.

3. The method of claim 1 in which chlorination is at a temperature of about 550 to 650° F.

4. The method of claim 1 in which the covalent compound of chlorine is carbon tetrachloride.

5. The method of claim 1 in which the covalent compound of chlorine is sulfur monochloride.

6. The method of claim 1 in which the chlorinating mixture comprises molecular chlorine and carbon tetrachloride.

7. The method of claim 5 in which the chlorinating mixture comprises molecular chlorine and sulfur monochloride.

8. The method of claim 1 in which the chlorinating mixture has about 0.04 to 10 parts by weight of the covalent compound per part of the selected chlorinating gas.

9. The method of claim 1 in which the inert diluent is nitrogen.

10. The method of claim 9 in which the inert diluent is supplied in amounts of about 2–15 percent based on the weight of the catalyst treated.

11. The method of claim 1 in which the inert diluent is air.

References Cited in the file of this patent

UNITED STATES PATENTS

| | | |
|---|---|---|
| 2,481,253 | Snyder | Sept. 6, 1949 |
| 2,488,744 | Snyder | Nov. 22, 1949 |